Nov. 27, 1962  J. J. KERLEY, JR., ET AL  3,065,959
SHOCK AND VIBRATION ISOLATOR WITH SADDLE ARRANGEMENT
Filed June 6, 1960

JAMES J. KERLEY, JR.
YONAN J. SHEREDOS
INVENTOR.

BY Walter J. Finch
ATTORNEY

United States Patent Office 3,065,959
Patented Nov. 27, 1962

3,065,959
SHOCK AND VIBRATION ISOLATOR WITH
SADDLE ARRANGEMENT
James J. Kerley, Jr., Cheverly, Md., and Yonan J. Sheredos, N. Plainfield, N.J., assignors to Kerley Engineering, Inc., College Park, Md., a corporation of Maryland
Filed June 6, 1960, Ser. No. 34,148
5 Claims. (Cl. 267—1)

This invention relates generally to shock and vibration isolator supports, and more specifically it pertains to a saddle arrangement for supporting the cable loops of cable type shock and vibration isolators.

Shock and vibration isolators assemblies of the cable type generally consists of a plurality of parallel resilient ropes or cables extending between spaced pairs of mating mounting strips. To facilitate the manufacture of such assemblies, it has been the practice to use a single continuous length of cable and reeve it back and forth between the spaced pairs of mating mounting strips.

Some forms of strips have incorporated semi-circular channels in the mating strips wherein the cable bight is uniformly supported and such construction has superior strength.

However, because the cables must emerge from the strips essentially straight and parallel with each other, a rather wide and necessarily heavy strip is required to incorporate a bight channel with some degree of straight arms. Another disadvantage of bight channel incorporating strips is the difficulty with which they are reeved with the cable. Split or two piece strips are attractively easy to assemble but if the split extends through the bight channel, it is potentially a weak cradle or saddle under the condition of cable strain.

It is, therefore, an object of the present invention to provide a cable bight forming and supporting saddle for reeved cable shock and vibration type isolators.

Another object of this invention is to provide a spaced saddle piece for uniformly distributing the load from the loops of shock and vibration isolating cable to the mounting strips and directing them therethrough.

Still another object of this invention is to provide a cable type shock and vibration isolator having a separate unitary saddle forming piece for facilitating the manufacture and providing increased strength thereof.

These and other objects and advantages of this invention will become more readily apparent and understood from the accompanying specification and single sheet of drawings in which.

Figure 1:
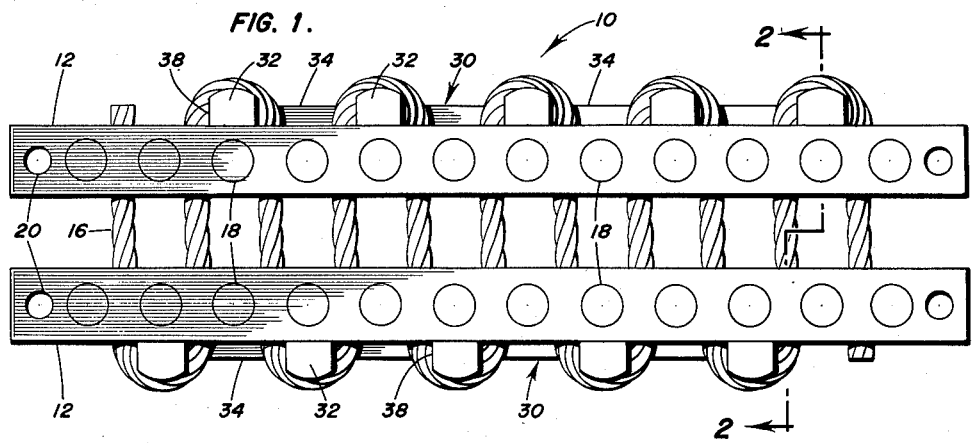
FIG. 1 is a side elevation of a cable type shock and vibration type isolator incorporating features of this invention.

Referring now to the details of the drawings, particularly FIG. 1, there is shown a cable type shock and vibration type isolator assembly which is indicated generally by reference numeral 10. The isolator assembly 10 consists of two spaced pairs of flat mating sandwiching strips or bars 12. The pairs of mating strips 12 are spaced one from the other, and have a plurality of passes of twisted multi-strand resilient cable 16 extending between and reeved back and forth therebetween.

Each strip of each pair of mating strips 12 is formed with a plurality of parallel spaced semi-cylindrical grooves 14. The two mating strips for each pair of strips 12 are secured together by a plurality of spaced rivets 18 so that the grooves 14 of one strip are in oppositional register with those of the other strip of the mating pair of strips 12. The ends of the pairs of mating strips 12 are provided with drilled mounting holes 20.

Figure 4:
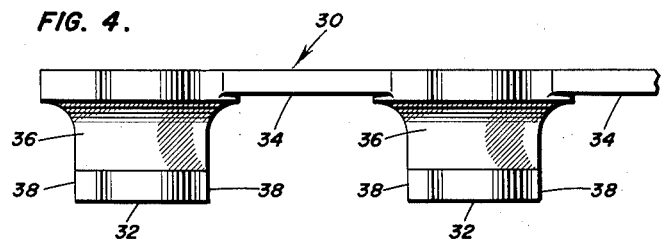
FIG. 4 is a top view of the saddle piece illustrated in FIG. 3.
Figure 3:
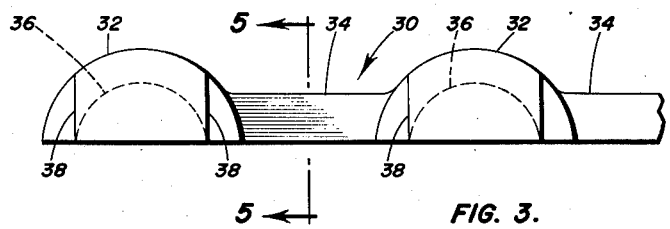
FIG. 3 is an enlarged side view of a portion of a spaced saddle support for the shock and vibration isolator of FIG. 1.
Figure 5:
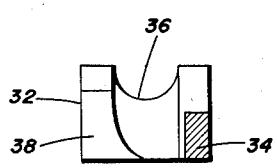
FIG. 5 is a section taken along the line 5—5 of FIG. 3.

Each isolator assembly 10 requires a pair of spaced saddle members 30, which are positioned on opposite sides of the pairs of mating strips 12 but adjacent thereto as shown best in FIG. 1. As shown in detail in FIGS. 3, 4, and 5, each saddle member 30 consists of a plurality of saddles 32 secured to each other and spaced by a web or saddle spacer 34. Each saddle 32 includes a semi-circular annular groove 36 which is trimmed on its ends to provide cable clearing parallel flats 38 on the unwebbed side of the saddle member 30 as best shown in FIG. 5.

Figure 2:
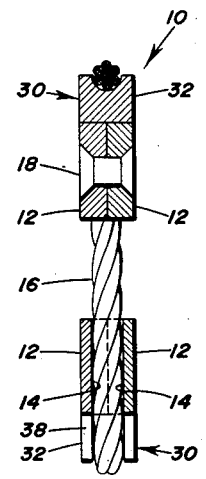
FIG. 2 is a cross section taken along the line 2—2 of FIG. 1.

The twisted multi-stranded resilient cable 16 is reeved back and forth between the pairs of mating spaced strips 12, and saddle members 30, with each pass of cable 16 transversing the passage formed by opposing grooves 14 and bending over and against its respective saddle 32, as shown in FIG. 2. It will be noted that the cable 16 thus supported at its bends by saddles 32 bears against a solid unitary cradling structure and not a split assembly such as the paired sandwiching strips 12.

The sections of the cable 16 are caused to pass perpendicularly and parallel as desired through the sandwiching strips 12 without distortion or stress.

For these reasons, a stronger shock and vibration isolator assembly 10 in tension results. Further, because the saddle member 30 assembles all the saddles 32 in position simultaneously from the sides of the cable loops, with clearance being provided by the flats 38, a more rapid assembly of the isolator assembly 10 procedure is posisible.

Obviously many modifications and variations of the present invention are possible in light of the above teachings. It is therefore, to be understood that within the scope of the appended claims the invention may be practiced otherwise than as specifically described.

What is claimed is:

1. A shock and vibration isolator assembly, comprising, two pairs of parallel spaced strips, each pair of strips having a plurality of spaced corresponding mating grooves provided in adjacent faces thereof, saddles positioned between adjacent grooves, said saddles being positioned on opposite sides of said pairs of parallel spaced strips and each saddle abutting both strips of the adjacent pair, and a resilient cable reeved back and forth between said spaced pairs of mating strips and through the grooves thereof with the bend of the cable between adjacent grooves encompassing and being supported by its respective saddle.

2. A shock and vibration isolator assembly, comprising two pairs of coplanar parallel spaced strips, each pair of strips having a plurality of spaced corresponding mating grooves provided therein, a plurality of spaced cable bight-supporting saddles, each saddle being positioned between adjacent grooves, said saddles being positioned on opposite sides of said pair of coplanar parallel spaced strips and each saddle abutting both strips of the adjacent pair, and a resilient cable passed back and forth between said pairs of mating strips, with the bend of the cable between adjacent grooves encompassing and being supported by the bight of its respective saddle.

3. A split sandwiching bar for bight-forming and directing passes of resilient cable for a shock and vibration isolator, comprising, a pair of strips arranged in face to face relationship, said pair of strips having a plurality of spaced mating grooves provided therein in the faces of said strips, saddles positioned between adjacent grooves, the saddles being positioned on one side of said pair of parallel spaced strips and abutting both strips of said pair, and a resilient multi-strand cable reeved back and forth in the grooves in said pair of mating strips, with the bend of the cable between adjacent grooves encompassing and being supported by its respective saddle.

4. A shock and vibration isolator assembly as recited in claim 1 wherein adjacent saddles are connected independently of said strips by an elongated connecting member.

5. The structure defined in claim 2 wherein said saddles are clipped and comprise a pair of parallel faces extending to only one of the adjacent pair of strips.

References Cited in the file of this patent

UNITED STATES PATENTS

| | | |
|---|---|---|
| 1,291,926 | Kleucker | Jan. 21, 1919 |
| 2,015,403 | Kiddle | Sept. 24, 1935 |
| 2,232,456 | Hewetson | Feb. 18, 1941 |
| 2,615,402 | Chamberlain | Oct. 28, 1952 |
| 2,873,109 | Hartenstein et al. | Feb. 10, 1959 |